United States Patent [19]
Gilbert et al.

[11] Patent Number: 6,041,376
[45] Date of Patent: Mar. 21, 2000

[54] DISTRIBUTED SHARED MEMORY SYSTEM HAVING A FIRST NODE THAT PREVENTS OTHER NODES FROM ACCESSING REQUESTED DATA UNTIL A PROCESSOR ON THE FIRST NODE CONTROLS THE REQUESTED DATA

[75] Inventors: Bruce Michael Gilbert, Beaverton; Robert T. Joersz, Portland; Thomas D. Lovett, Portland; Robert J. Safranek, Portland, all of Oreg.

[73] Assignee: Sequent Computer Systems, Inc., Beaverton, Oreg.

[21] Appl. No.: 08/850,736

[22] Filed: Apr. 24, 1997

[51] Int. Cl.⁷ .................................................. G06F 13/364
[52] U.S. Cl. ..................... 710/108; 709/238; 710/100; 710/107; 710/200; 711/118; 711/147
[58] Field of Search .................................... 709/228, 206, 709/238; 711/147, 118; 710/108, 100, 107, 200; 707/4, 10

[56] References Cited

U.S. PATENT DOCUMENTS

| | | | |
|---|---|---|---|
| 4,236,209 | 11/1980 | Lombardo, Jr. et al. | 709/249 |
| 4,503,499 | 3/1985 | Mason et al. | 395/671 |
| 4,587,609 | 5/1986 | Boudreau et al. | 710/200 |
| 4,805,106 | 2/1989 | Pfeifer | 710/200 |
| 5,210,867 | 5/1993 | Barlow et al. | 364/238.4 |
| 5,596,744 | 1/1997 | Dao et al. | 707/10 |
| 5,634,053 | 5/1997 | Noble et al. | 707/4 |
| 5,778,384 | 7/1998 | Provino et al. | 707/200 |
| 5,802,578 | 9/1998 | Lovett | 711/147 |
| 5,822,586 | 10/1998 | Strutt et al. | 709/304 |
| 5,835,943 | 11/1998 | Yohe et al. | 711/118 |
| 5,884,046 | 3/1999 | Antonov | 709/238 |
| 5,943,483 | 8/1999 | Solomon | 710/107 |
| 5,948,062 | 9/1999 | Tzelnic et al. | 709/219 |
| 5,968,150 | 10/1999 | Kametani | 710/100 |
| 5,983,326 | 11/1999 | Hagersten et al. | 711/147 |
| 5,987,550 | 11/1999 | Shagam | 710/119 |
| 6,006,299 | 12/1999 | Wang et al. | 710/108 |

FOREIGN PATENT DOCUMENTS 408006838  1/1996  Japan .

*Primary Examiner*—Thomas C. Lee
*Assistant Examiner*—Tammara Peyton
*Attorney, Agent, or Firm*—Klarquist Sparkman Campbell Leigh & Whinston

[57] ABSTRACT

A multiprocessor system that assures forward progress of local processor requests for data by preventing other nodes from accessing the data until the processor request is satisfied. In one aspect of the invention, the local processor requests data through a remote cache interconnect. The remote cache interconnect tells the local processor to retry its request for data at a later time, so that the remote cache interconnect has sufficient time to obtain the data from the system interconnect. When the remote cache interconnect receives the data from the system interconnect, a hold flag is set. Any requests from other nodes for the data are rejected while the hold flag is set. When the local processor issues a retry request, the data is delivered to the processor and the hold flag is cleared. Other nodes may then obtain control of the data.

23 Claims, 10 Drawing Sheets

FIG. 4

REMOTE CACHE TAG 36

| ADDRESS | CACHE STATE | FORWARD POINTER | BACK POINTER | VALID | LOCKED |
|---|---|---|---|---|---|

MEMORY TAG 34

| MEMORY STATE | HEAD POINTER |
|---|---|

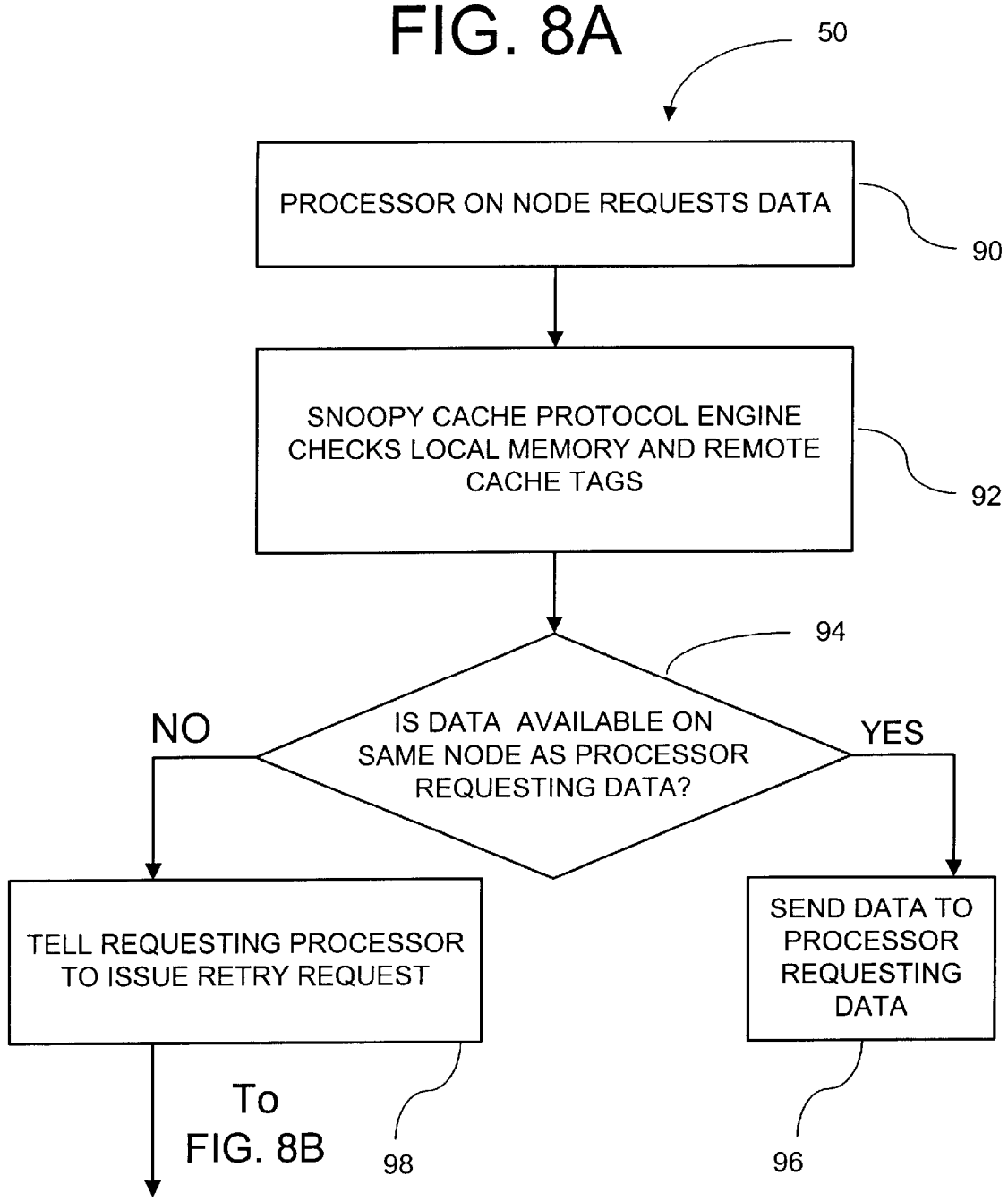

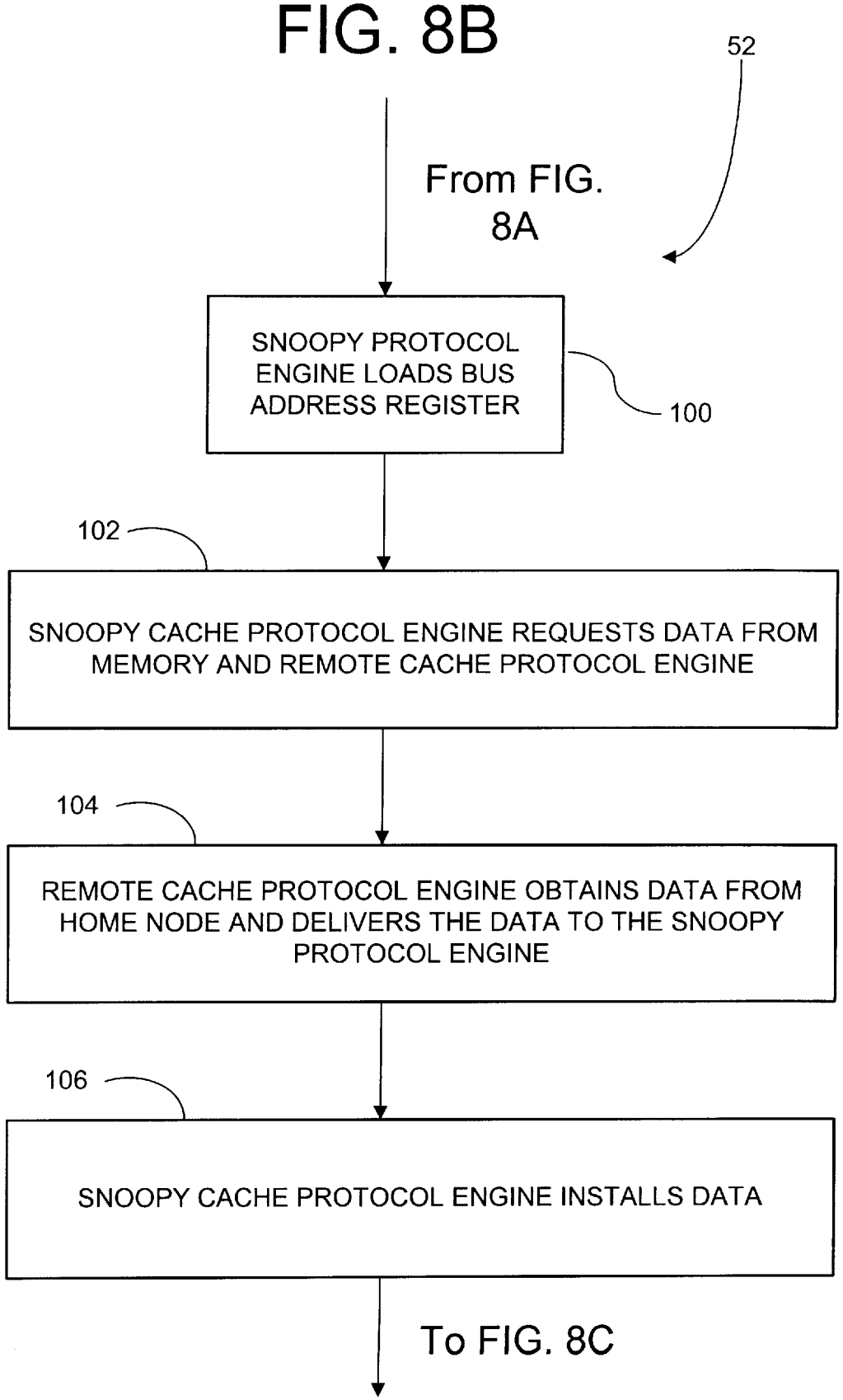

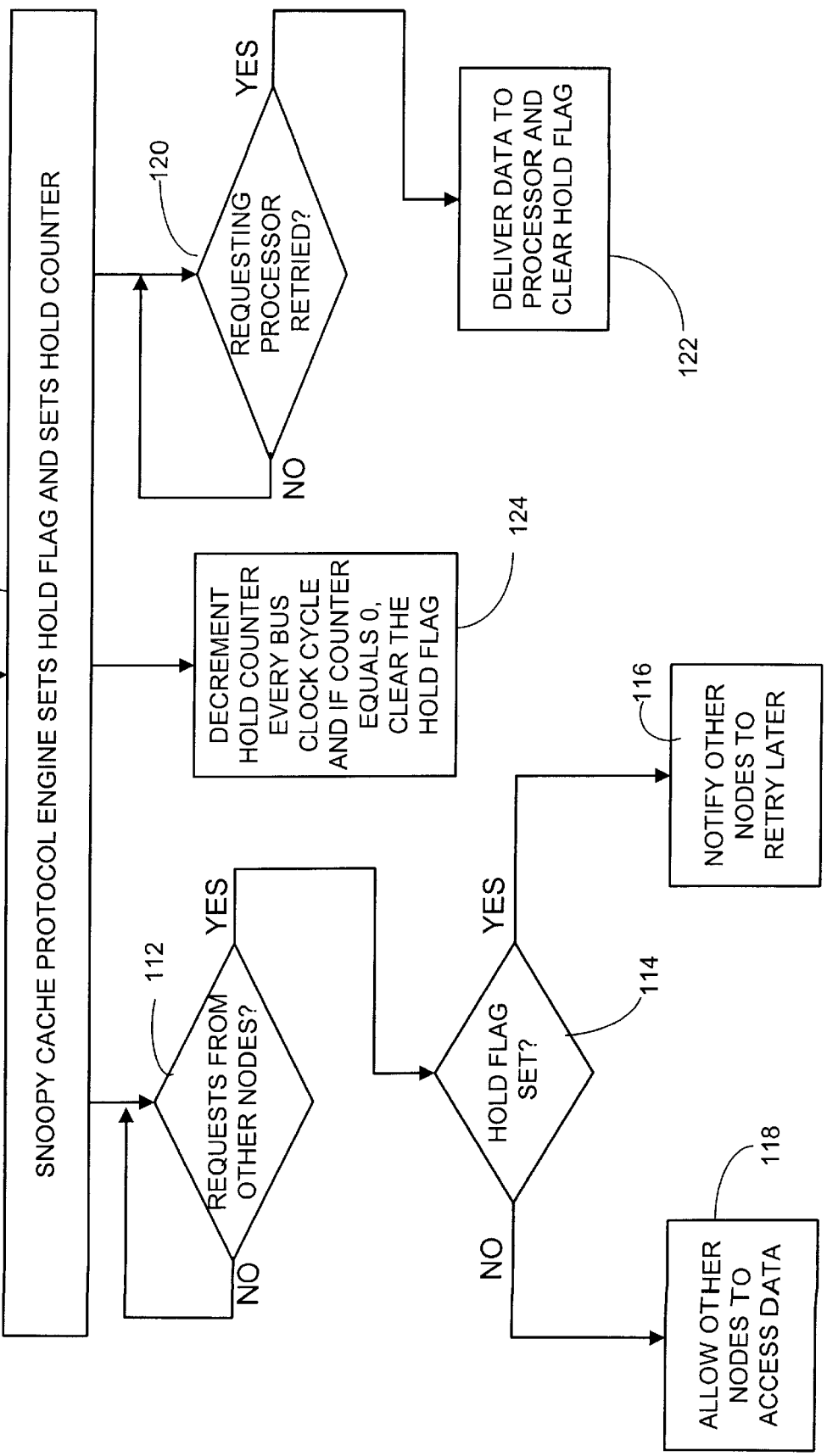

6,041,376

DISTRIBUTED SHARED MEMORY SYSTEM HAVING A FIRST NODE THAT PREVENTS OTHER NODES FROM ACCESSING REQUESTED DATA UNTIL A PROCESSOR ON THE FIRST NODE CONTROLS THE REQUESTED DATA

FIELD OF THE INVENTION

This invention relates generally to computer architecture. More particularly, this invention relates to a multiprocessor computer system that uses distributed shared memory.

BACKGROUND OF THE INVENTION

Multiprocessor computers by definition contain multiple processors that can execute multiple parts of a computer program or multiple programs simultaneously. In general, this parallel computing executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory that allow them to read or write to the same memory location in the computer. Message passing multiprocessor computers, on the other hand, have a separate memory space for each processor. Processes communicate through messages to each other.

Multiprocessor computers may also be classified by how the memory is physically organized. In distributed memory computers, the memory is divided into modules physically placed near each processor. This placement provides each processor with faster access time to its local memory. By contrast, in centralized memory computers, the memory is physically in just one location, generally equidistant in time and space from each of the processors. Both forms of memory organization use high-speed cache memory in conjunction with main memory to reduce execution time.

Multiprocessor computers with distributed shared memory are often organized into nodes with one or more processors per node. A node also includes local memory for the processors, a remote cache for caching data obtained from memory on other nodes, and a remote cache interconnect. The remote cache interconnect interfaces with other nodes on the computer through a network by using a cache coherency protocol, such as the protocol described in the Scalable Coherent Interface (SCI)(IEEE 1596).

A processor on a node communicates directly with the local memory and communicates indirectly with memory on other nodes by using the remote cache interconnect. For example, if the desired data is in local memory, a processor can obtain the data by accessing the local memory directly over a node bus. If, however, the desired data is located in a memory on another node, the processor has no direct access to the other nodes. Instead, the processor must make a request to the remote cache interconnect. The remote cache interconnect then obtains the requested data from another node on the network and delivers the data to the requesting processor.

The processor communicates with the remote cache interconnect through either a deferred request or a retry request. In a deferred request, the remote cache interconnect passes the data to the processor over the node bus as soon as the remote cache interconnect receives the data from the network. In a retry request, the remote cache interconnect holds the data received from the network and waits for the processor to again request the data (a retry). When the processor retries its request, the remote cache interconnect passes the data over the node bus to the processor.

A problem occurs with distributed memory systems when multiple processors try to simultaneously obtain the same data using retry-type requests. In this circumstance, there is no guarantee that each processor will make forward progress: a processor may request data but never receive it. When several processors in different nodes try to obtain control of the same data, an endless cycle of stealing data from each processor can occur.

The problem is best understood by example. Assume a first processor on a first node requests ownership of a data line (i.e., a block of memory) located on a remote node. The node's remote cache interconnect requests the data line from the network. When the data line is received, the remote cache interconnect waits for the first processor to retry its request for the data line. During this interim period, a second processor on a second node requests ownership of the same data line. Using current cache protocols, the first node responds by passing control of the data line to the second node before the first processor retries its request for the data line. A retry request made by the first processor is then rejected. The second node, in essence, has stolen the data line from the first node before the first processor received control of the data line. The remote cache interconnect on the second node now waits for the second processor to issue its retry request. During this interim period, the first processor again requests ownership of the same data line. By doing so, the first processor steals the data line back from the second node before the second processor receives control of the data line. This cycle can continue indefinitely and no forward progress by either processor is made.

An objective of the invention, therefore, is to provide a multiprocessor computer system that guarantees forward progress of processor requests. A further objective of the invention is to provide such a system that conforms with existing cache coherent protocols, such as the SCI protocol.

SUMMARY OF THE INVENTION

The present invention provides a multiprocessor system that assures forward progress of processor requests for data. A remote cache interconnect maintains control of data received from a remote node until the data is delivered to a requesting processor. For example, if another node requests the data from the remote cache interconnect before the data is delivered to the requesting processor, such a request is rejected and the other node is told to retry its request at a later time.

In one aspect of the invention, a remote cache interconnect (also called a network controller) within a node has access to a hold flag. The remote cache interconnect sets or activates the hold flag when it receives data from the system interconnect for delivery to a requesting processor. Any requests from other nodes for the data are rejected while the hold flag is set. When the requesting processor issues a retry request, the data is delivered to the requesting processor and the hold flag is cleared or deactivated. Once the hold flag is cleared, other nodes can obtain control of the data.

In another aspect of the invention, a counter tracks how long the hold flag has been set. After the counter exceeds a predetermined time limit, the hold flag is cleared. The counter ensures that other nodes can access the data if a requesting processor does not retry its request.

A multiprocessor computer system according to the invention guarantees forward progress by allowing a node to fully satisfy a request made by a processor within that node before the data is accessible to other nodes. Forward progress is also assured by limiting the amount of time that other nodes are prevented from accessing the data in the case where a requesting processor never retries its request. The hold flag may prevent other nodes from accessing all data on the node or it may hold data on a per-line basis so that other nodes can access data unrelated to the held data.

The foregoing and other objects, features, and advantages of the invention will become more apparent from the following detailed description of a preferred embodiment which proceeds with reference to the following drawings.

BRIEF DESCRIPTION OF THE DRAWINGS

FIG. 4 is a diagram showing the fields of a memory tag and a cache tag.

FIG. 8A is a flow chart of communication between a processor and the remote cache interconnect.

FIG. 8B is a flow chart of communication between the remote cache interconnect and the system interconnect.

FIG. 8C is a flow chart of steps taken by the remote cache interconnect after receiving data from the system interconnect to guarantee forward progress.

DETAILED DESCRIPTION OF A PREFERRED EMBODIMENT

System Overview

Figure 1:
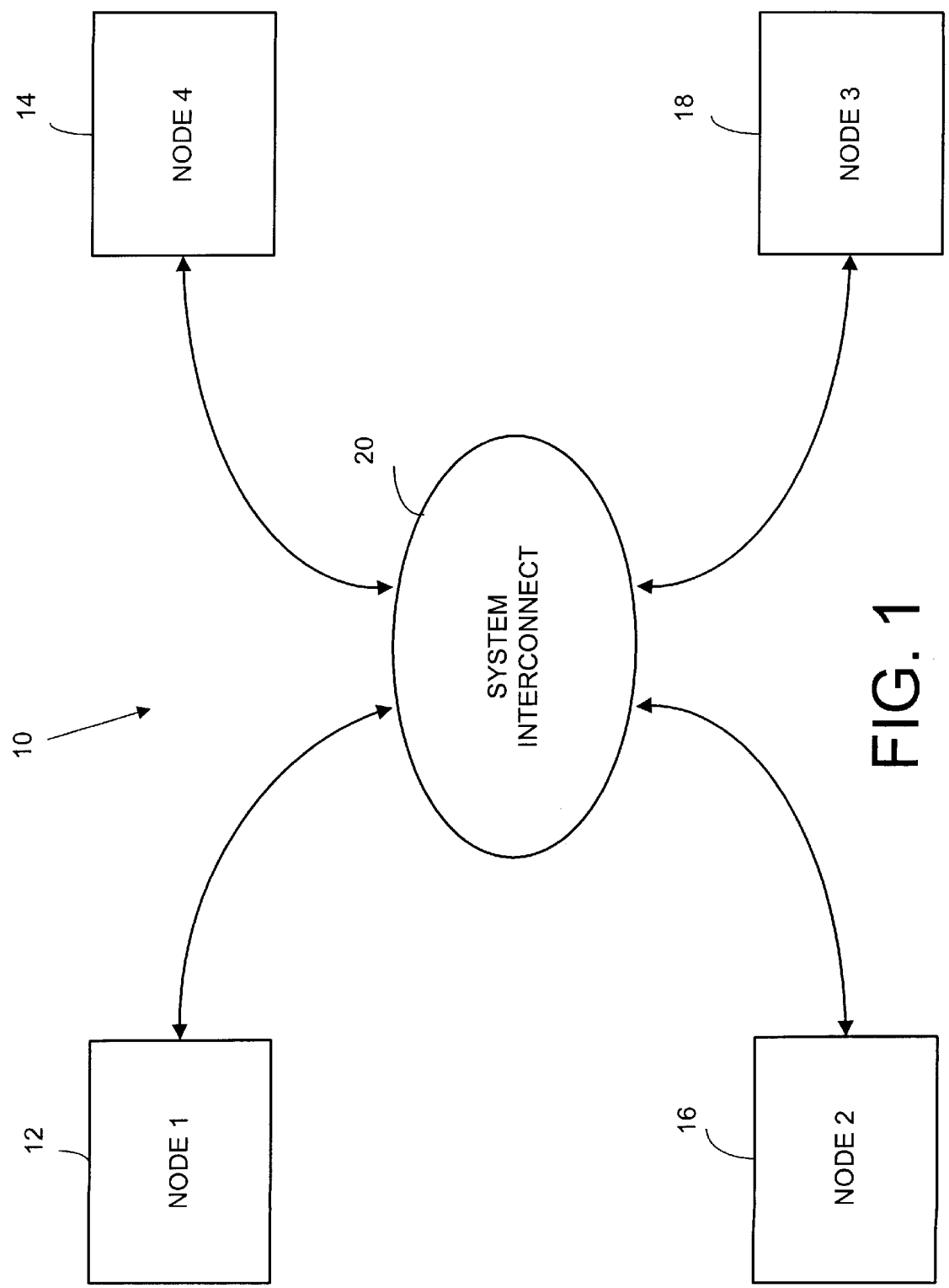
FIG. 1 is a block diagram of a multinode, multiprocessor computer system with a system interconnect coupling the nodes together in accordance with the invention.

FIG. 1 is a block diagram of a multinode, multiprocessor computer system 10 in accordance with the invention. System 10 uses a computer architecture based on Distributed-Shared Memory (DSM). Four nodes 12–18 are shown connected by a system interconnect 20 (i.e., a network) that permits any node to communicate with any other node. Specifically, the purpose of system interconnect 20 is to allow processors in any node to access the memory resident in any other node with cache coherency guaranteed. System interconnect 20 is a switch-based network that uses the Scalable Coherent Interface (SCI) interconnection mechanism. SCI is an IEEE-approved standard, or protocol (1596), well documented in a number of publications including IEEE Std 1596–1992 (Aug. 2, 1993) and *Multiprocessor Interconnection Using SCI,* a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12–18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin-Madison.

Node Overview

Figure 2:
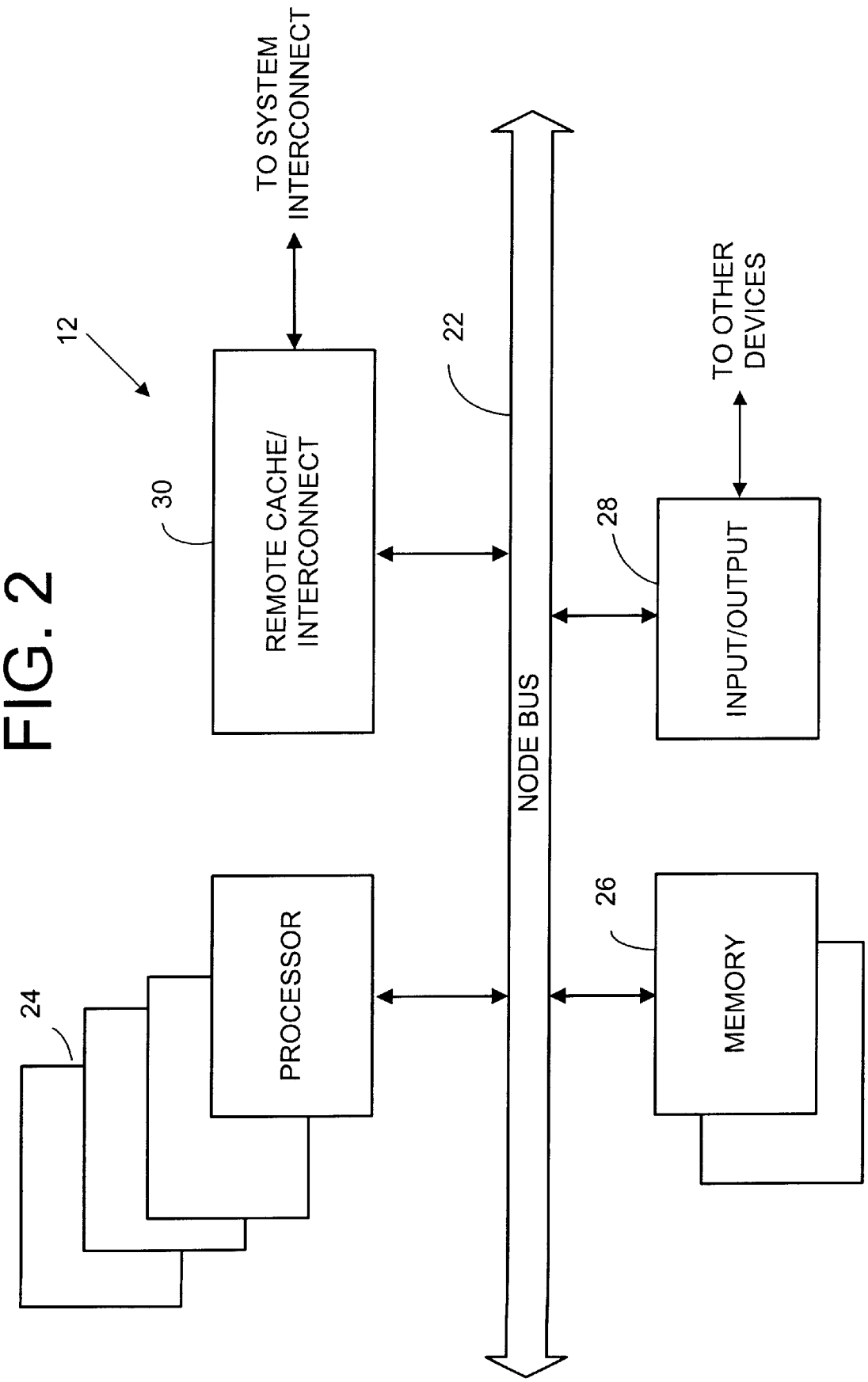
FIG. 2 is a block diagram of one of the nodes of the computer system of FIG. 1.

A block diagram of node 12 of system 10 is shown in FIG. 2. The node includes a conventional symmetrical multiprocessor (SMP) node bus 22 for connecting multiple data processors 24 to local memory 26. For clarity, nodes 12–18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O may be of conventional design and includes means for connecting the node (and hence system 10) to personal computers, local area networks, etc., that wish to utilize the power of the multinode computer system. To connect node 12 to the other nodes in the system, the node includes a remote cache interconnect 30. The remote cache interconnect forms part of interconnect 20 along with the physical links between nodes and the same devices on the other nodes of the computer system 10. In the present embodiment, interconnect 30 is constructed to implement the SCI standard for data communication between the nodes, allowing a processor on one node to access data stored on another node. The interconnect 30 also contains a remote cache in the present embodiment, although this combination is not required for the invention. The remote cache could as well be separate from the remote cache interconnect.

Remote Cache Interconnect Overview

Figure 3:
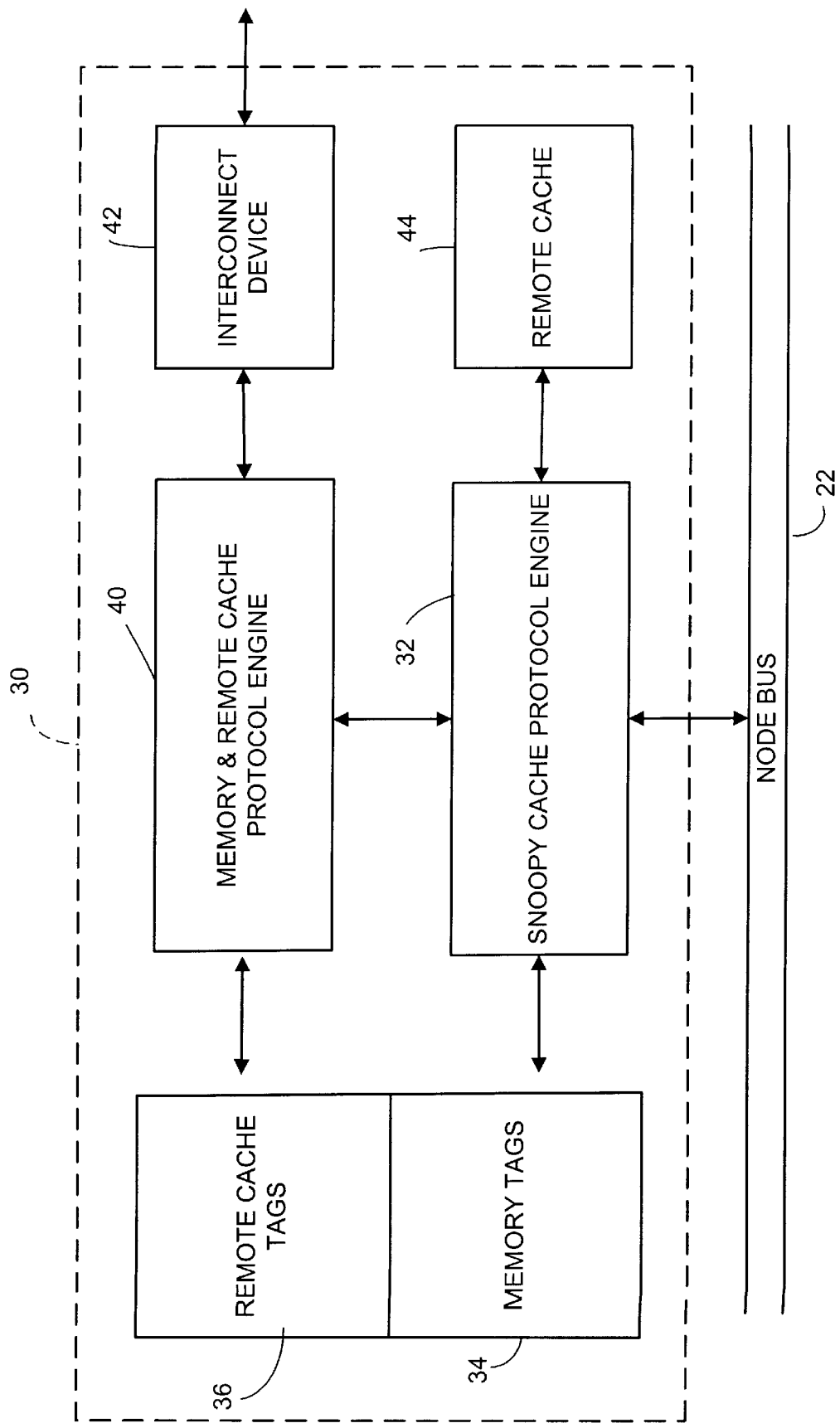
FIG. 3 is a block diagram of a remote cache interconnect within the node of FIG. 2.

FIG. 3 is a block diagram showing the remote cache interconnect 30 in more detail. The remote cache interconnect includes a snoopy cache protocol engine 32, storage for memory tags and remote cache tags 34 and 36, a memory and remote cache protocol engine 40, an interconnect device 42, and a remote cache 44.

To maintain coherence among the remote caches in the nodes of computer system 10, the system uses a chained directory scheme defined in the SCI protocol. The chained directory is implemented as a doubly linked sharing list that keeps track of which caches share the same data. With this sharing list, remote caches can be notified when the data they share has been changed and thus is no longer valid. FIG. 4 shows the makeup of a remote cache tag 36, which is an element of the sharing list. The remote cache tag is linked into the chained directory to indicate that the node's remote cache 44 contains a copy of the shared data. Tag 36 contains a number of fields including the Address field, which identifies the memory block cached in the remote cache, and the Cache State field, which gives the state of the cache.

Figure 5:
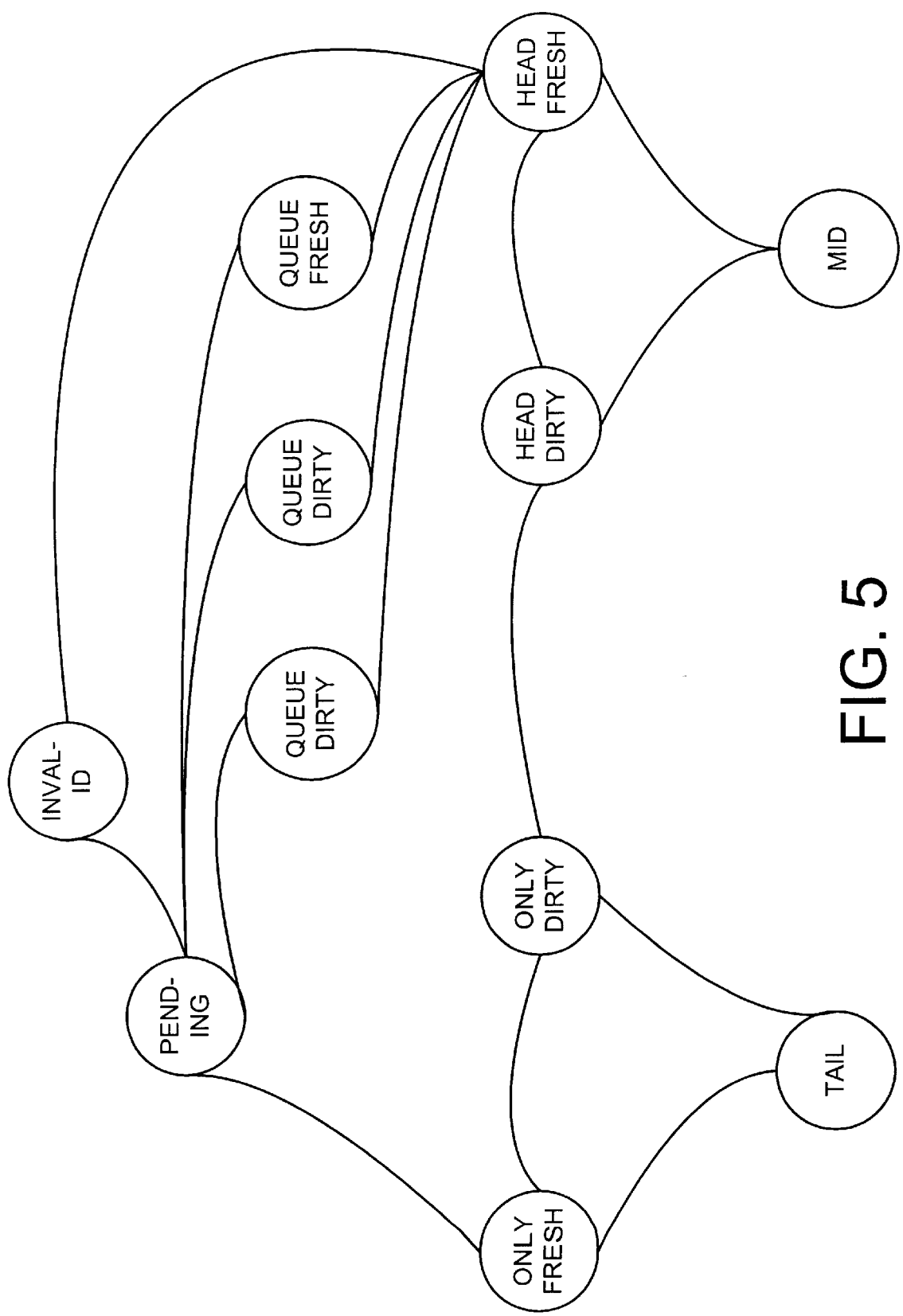
FIG. 5 is a state diagram of the remote cache states.

The remote cache states used in the present embodiment are shown in the state diagram of FIG. 5. Table 1 identifies and describes the pertinent cache states.

TABLE 1

| Name | Description |
| --- | --- |
| CS_INVALID | Line is invalid and can be used for caching new lines |
| CS_ONLY_FRESH | Only cached copy, consistent with memory |

TABLE 1-continued

| Name | Description |
| --- | --- |
| CS_ONLY_DIRTY | Only cached copy, writable and inconsistent with memory |
| CS_HEAD_FRESH | Head of fresh list, consistent with memory |
| CS_HEAD_DIRTY | Head of valid list, writable and inconsistent with memory |
| CS_MID_VALID | Mid element in valid list, possibly inconsistent with memory |
| CS_TAIL_VALID | Tail of valid list, possibly inconsistent with memory |
| OD_RETN_IN | Only_Dirty block getting off list |
| OD_SPIN_IN | Prepend while getting off list |
| CS_QUEUED_FRESH | Attached to list, notifying old head |
| CS_QUEUED_DIRTY | Attached to fresh list for write, invalidating list |
| CS_PENDING | Waiting for response from home node local memory |
| CS_QUEUED_JUNK | Attached to dirty list, getting data from old head |
| MV_FORW_MV | Rollout from MID, waiting for response from ForwID |
| MV_BACK_IN | Rollout from MID, waiting for response from BackID |
| HD_INVAL_OD | Write to dirty list, invalidating list |
| OF_RETN_IN | Rollout from only_Fresh, waiting for response from Memory |
| HD_FORW_HX | Rollout from Head_Dirty |
| HD_FORW_OX | List Collapsed during rollout from Head_Dirty |
| OF_MODS_OD | Writing to Only_Fresh list, transitioning to Only_Dirty |
| HF_FORW_HX | Rollout from Head_Fresh |
| HF_FORW_OX | List Collapsed during rollout from Head_Fresh |
| HF_MODS_HD | Write to fresh list, converting list to dirty |
| TO_INVALID | Invalidated while getting off list |
| TV_BACK_IN | Rollout from Tail |
| HX_RETN_IN | Rollout from Head, informing home node local memory of new head |

Returning to FIG. 4, the other fields are well defined in the SCI protocol. The Forward Pointer field contains a pointer to a previous cache in the sharing list, toward the list tail. The Backward Pointer field contains a pointer to a later cache or to a local memory in the sharing list, toward the list head. Elements are added to a sharing list as the head of the list, with the oldest element thus being the tail of the list. The Valid field is set to indicate that the cache tag is valid. The Locked field is set to indicate that this cache tag is to presently remain in the cache tag storage and not be replaced by the cache line replacement algorithm.

The state of local memory 26 is maintained in the memory tags 34. The memory tags store information about the states of the memory blocks, or lines, stored within local memory 26. FIG. 4 shows the composition of a memory tag, one of which is associated with each memory block. The tag has two fields: a Memory State field which indicates the state of the data in the memory block, and a Head Pointer field. Table 2 identifies and describes the pertinent memory states in a memory tag.

TABLE 2

| Name | Description |
| --- | --- |
| MS_HOME | No sharing list exists and memory is valid |
| MS_FRESH | Sharing list copies are identical with memory |
| MS-GONE | Sharing list copies might be different from memory |
| MS_BUSY | Memory state is being changed |

The Head Pointer field contains a pointer which, if the memory state of the block is GONE or FRESH, points to the node whose remote cache is the head of the sharing list and in which valid data for that memory block is cached.

Table 3 shows typical cache states in a sharing list for a given memory state.

TABLE 3

| Memory | Head | Mid | Tail |
| --- | --- | --- | --- |
| MS_HOME | — | — | — |
| MS_FRESH | CS_ONLY_FRESH | — | — |
| MS_FRESH | CS_HEAD_FRESH | — | CS_TAIL_VALID |
| MS_FRESH | CS_HEAD_FRESH | CS_MID_VALID | CS_TAIL_VALID |
| MS_GONE | CS_ONLY_DIRTY | — | — |
| MS_GONE | CS_HEAD_DIRTY | — | CS_TAIL_VALID |
| MS_GONE | CS_HEAD_DIRTY | CS_MID_VALID | CS_TAIL_VALID |

Note that the cache state also reflects the location of the cache in the sharing list: head, midpoint, or tail.

Operation of Remote Cache Interconnect

With this as background, the structure and operation of remote cache interconnect 30 can now be understood by way of example. If a processor 24 in node 12 requests data, the request is first reviewed by snoopy cache protocol engine 32. The protocol engine compares the address of the requested data with the memory tags 34 and remote cache tags 36 to determine if the data is stored in the node. If the data's address is in local memory, then node 12 is the home node for the memory block containing the data. A memory tag 34 exists and indicates whether the data is valid and, if not, indicates through the head pointer on which node the valid data can be found. If the data's address is not in local memory 26, there is no memory tag 34 for it. However, if a copy of the data has previously been stored in remote cache 44, then a cache tag 36 exists in the node for the data. The tag 36 indicates whether the data is valid and, if not, on which node the valid data can be found.

If the processor request is a write, the protocol engine 32 again reviews the address to determine if a memory tag 34 or cache tag 36 exists in the node for the address. The procedure is the same as for the read, except that any sharing list containing the data to be changed by the write is invalidated. If the data to be changed is already in remote cache 44, then the node is already on a sharing list. Unless the node is already the head of the list, it must first be removed and then made the head before the list is invalidated. Protocol engine 40 on node 12 sends a message to the node "below" it on the list, passing its backward pointer so that the node below now points to the node "above" node 12. Protocol engine 40 then sends a message to the node above, passing its forward pointer so that the node above now points to the node below. Node 12 is now off the sharing list. Protocol engine now sends a message to the home node for the data being changed, indicating that it wants to be head of the list and be allowed to write the memory block containing the data. The home node responds by setting its head pointer to point to node 12, changing its memory state to GONE, and returning the requested data in the memory block and the pointer to the old head of the current sharing list for the memory block. Finally, protocol engine 40 sends a message to the old head informing the old head that it is no longer the head. Protocol engine proceeds to invalidate the list by sending the appropriate command to each node in the list, in turn. The cache state of tag 36 in node 12 for this memory block is now ONLY_DIRTY, since it is presently the only element of the list. If processors in other nodes read this data, these nodes will be added to the list and the state of tag 36 will change to TAIL.

Messages are sent between nodes through the memory & remote cache protocol engine 40 and interconnect device 42 in standard SCI format. Engine 40 puts together the appropriate SCI packet and passes it to device 42 for sending to the desired node. The interconnect device provides the SCI-compliant link-level interface to the other nodes of system 10. It also contains the link-level queues and the associated arbitration, queue mechanisms, and error checking to provide SCI-packet delivery services for the node.

Returning to the example, if the requested data is not in remote cache 44 or local memory 26, the snoopy cache protocol engine 32 passes the data request to remote cache protocol engine 40. Engine 40 then sends the request in the manner described via device 42 to the home node for the data, such as node 14. The memory tag for the requested memory line in node 14 is checked to determine if the data stored in memory is valid (HOME or FRESH). If so, node 14 returns a copy of the data to node 12. The memory tag's head pointer in node 14 is changed to point to remote cache 44 on node 12 as the new head of the list of nodes sharing the data. If the processor request from node 12 is for a possible write, the tag's memory state is also changed, to GONE.

The data retrieved from node 14 is sent to the snoopy cache protocol engine 32 on node 12 and stored in remote cache 44. If the processor's request is a deferred request, then the snoopy cache protocol engine can pass the data to the processor to complete the request. If, however, the processor was told to retry its request at a later time, then the snoopy cache protocol engine waits for the processor to retry its request. In either event, a remote cache tag 36 is created for the stored data. At this point, the address of the retrieved memory block, the cache state and the backward pointer (the node where the memory from which the data was retrieved is located, here node 14) are known and these fields in the cache tag 36 in node 12 are completed. If the processor request is a write, then remote cache 44 is now the head of a new sharing list and there is no forward pointer to other list elements. If the processor request is a read and the memory state is FRESH (indicating at least one remote cache has a valid copy of the memory's data line), then the tag's forward pointer is set to point to the node having the valid copy.

The list will grow as other nodes obtain copies of the data in remote cache 44. For example, if node 14, 16 or 18 requests the same data now in the remote cache of node 12, the requesting node becomes the head of the list. The backward pointer for the remote cache tag in node 12 changes from pointing to the node whose memory contains the data to pointing to the new list head.

Sharing lists of caches are maintained so that all nodes that share the same data can be notified when the shared data is changed. For example, assume that a sharing list for a certain memory block located in local memory of node 18 is headed by node 14 and also contains node 12 and node 16. If a processor 24 in node 12 now writes to this block in its remote cache 44, then the other nodes on the sharing list are notified to invalidate their copies of the data and the list is dissolved. Node 18 is also notified to change the memory state for the memory block to GONE. The head pointer for the memory tag in node 18 for this memory block is changed to point to node 12. A new list is created, with node 12 as the only element.

Problem with Cache Coherency Scheme

The SCI cache coherency scheme outlined above works well to maintain coherency among the remote caches of various nodes in the system 10. The scheme, however, has a problem: it does not guarantee that a processor requesting data makes progress toward obtaining that data. This need to move forward in obtaining requested data is often referred to as making "forward progress." After the data requested is received by the snoopy cache protocol engine 32, the data may be installed on the requesting node, but not provided to the requesting processor. This occurs when the requesting processor is told to retry its request at a later time and the snoopy cache protocol engine holds the data waiting for that request. When the processor retries its request for data, it is asking the snoopy cache protocol engine whether the data has been received from another node. But after the snoopy cache protocol engine receives the data, the system assumes that the requesting processor received the data requested, even though this is not necessarily the case. If other nodes request ownership of the data, the snoopy cache protocol engine gives up control per the SCI cache coherency protocol. The data is, in effect, stolen from the requesting processor before its retry request is issued. As a result, the system 10 may end up in an endless cycle of nodes stealing data from other nodes.

Overview of Forward Progress Method

Figure 6:
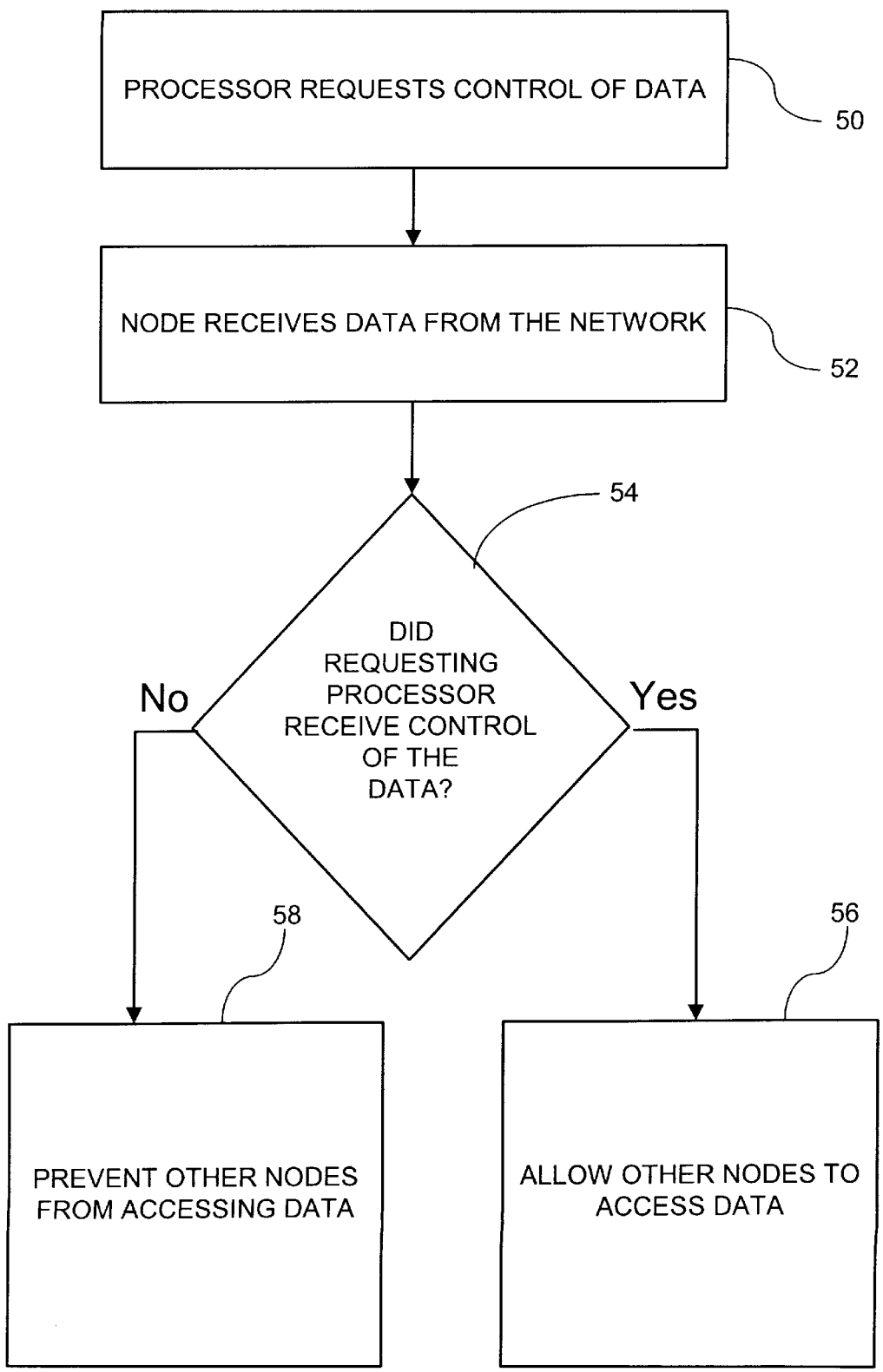
FIG. 6 is a flow chart of a method that guarantees forward progress in accordance with the invention.

FIG. 6 is a flow chart of a method according to the invention for guaranteeing forward progress. The requesting processor, such as processor 24 on node 12, requests access to a data line (step 50). A "data line" may be any size block of data from memory. Typically data lines are anywhere from 2 bytes to 256 bytes of data. Assuming the data line is located on another node in the system, the remote cache interconnect 30 obtains the data line from the system interconnect (step 52). Before the remote cache interconnect allows other nodes, such as nodes 14–18, to access the data line, it determines whether the requesting processor 24 received control (e.g., ownership of data for purposes of a write) of the data line requested (step 54). If the requesting processor received control of the data line, the remote cache interconnect 30 allows the other nodes to immediately access the data line (step 56). If, on the other hand, the requesting processor 24 did not receive control of the data line (e.g., the requesting processor 24 is busy performing other tasks and has not yet issued a retry request), the remote cache interconnect 30 prevents the other nodes from accessing the data line by issuing a retry request to the nodes in conformance with the SCI protocol (step 58). The other nodes must then retry their request for the data line at a later time.

When a processor is said to "control" a data line, other processors are minimally not able to write to the data line. Typically, the other processors are also prevented from reading the data line. In either case, the other processors are said to be denied "access" to the data line. A processor usually seeks control of a data line to write to the line. Allowing a single processor to control a data line ensures multiple processors cannot write to the same data line simultaneously.

Bus Address Register

Figure 7:
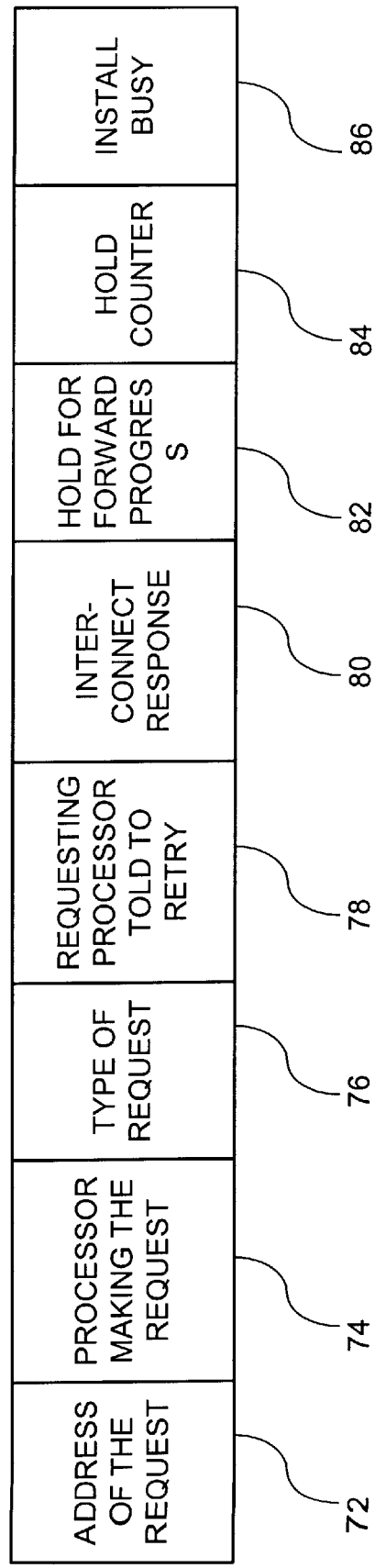
FIG. 7 shows a bus address register according to the invention, having a hold flag and a hold counter for guaranteeing forward progress.

The remote cache interconnect 30 determines whether control of the data line can be passed to the other nodes through a bus address register 70, shown in FIG. 7.

The bus address register resides in the snoopy cache protocol engine 32, but can alternatively be stored in other locations on the node, such as in the remote cache tags 36 or local memory tags 34. Any number of bus address registers may be used. Generally, one bus address register is used per request from a processor. With multiple processors on a node, it is desirable to have multiple bus address registers per node.

The bus address register includes an address-of-request field 72, a processor-making-the-request field 74, a type-of-request field 76, a retry field 78, an interconnect-response field 80, a hold-for-forward-progress field 82, a hold-counter field 84, and an installed-busy flag 86.

Field 72 stores the memory address of the data line requested by a local processor 24. The snoopy protocol engine 32 compares this field to the memory address of data received from the system interconnect. If a match is found, the snoopy protocol engine knows that a processor on the local node requested the received data.

Field 74 identifies the particular processor that made the request for the memory address identified in field 72.

Field 76 indicates the degree of control that the processor wants over the line. For example, the processor may want to read the data line, in which case it needs no control of the line, or the processor may want to write to the line, in which case it needs total control of the line.

Retry field 78 indicates whether the requesting processor has been told to retry. If the retry field is set, the snoopy cache protocol engine 32 waits for the processor to issue a retry request. Otherwise, the data can be passed directly to the processor without waiting, as in the case of a deferred request.

Field 80 stores the data line received from the system interconnect. The data line is typically anywhere from 2 bytes to 256 bytes in length. In the present invention, 64 bytes in length is used.

Field 82 stores the hold flag. When this flag is set, the snoopy cache protocol engine prevents other nodes or processors on the same node from accessing the data line.

Field 84 limits the amount of time that other nodes can be prevented from accessing the data line. The hold counter in the field is decremented over a predetermined period of time, and if the counter equals zero, the hold flag in field 82 is cleared to allow other nodes or processors on the same node to access the requested data line.

Flag 86, like the hold flag, prevents other nodes from accessing the data line when the installed-busy flag is set. There is a time lag between when the SCI protocol believes the data line is available for another node and when the snoopy cache protocol engine actually installs the line. Flag 86 is set as soon as the snoopy cache protocol engine receives the data line and is cleared when the snoopy cache protocol engine successfully installs the data line to account for this time lag.

Communication Between the Processor and Snoopy Engine

FIG. 8A shows an example of step 50 of FIG. 6 in more detail. Processor 24 makes a request for the data line to snoopy cache protocol engine 32 over node bus 22 (step 90). The snoopy cache protocol engine 32 checks memory tags 34 and remote cache tags 36 to determine whether the requested data is presently stored on the local node (step 92). If the snoopy cache protocol engine 32 determines in step 94 that the data line is available on the local node, the data line is transferred to the requesting processor from remote cache 44 or the processor obtains the data line directly from memory 26, and the transaction is completed (step 96). If, however, in step 94, the snoopy cache protocol engine determines that the data line is not stored locally, engine 32 informs the requesting processor that it must issue a retry request (step 98).

Communication Between Snoopy Engine and Cache Protocol Engine

FIG. 8B shows step 52 of FIG. 6 in greater detail. When a processor makes a request for data that must be obtained over interconnect 20, the snoopy cache protocol engine loads bus address register 70 (step 100). Specifically, the address-of-request field 72 (FIG. 7) is loaded with the address of the data line the processor requested. An identification number of the processor making the request is stored in field 74 of the bus address register. The type of request is stored in field 76, such as a read-for-ownership type request or a read request. Finally, a flag is set in field 78 indicating that the processor was told to retry its request.

To retrieve valid data from the system interconnect, the snoopy cache protocol engine 32 passes the data request to the memory and remote protocol engine (step 102). The protocol engine 40 checks memory tag 34 to determine which remote node is the present head of the sharing list for the data line and requests the data line via device 42. The node containing the data line responds to the data request according to the SCI protocol. In the simplest case, the head of the list supplies the data directly. In more complex cases, the head of the list notifies the requesting node that the valid data is now stored somewhere else. In any case, eventually the valid data is obtained by the requesting node per the SCI protocol. The received valid data is passed from device 42 through engine 40 to the snoopy cache protocol engine (step 104). The snoopy cache protocol engine then installs the data by loading it into the interconnect response field 80 in the bus address register (step 106).

Detailed Implementation of Forward Progress

FIG. 8C shows the preventing step 58 (FIG. 6) in greater detail. After receiving the data line and if the retry field 78 has been set, the snoopy cache protocol engine sets a hold flag in field 82 (FIG. 7) and sets the hold-counter field 84 to a predetermined number (step 110). If another node requests the data line in step 112, the snoopy cache protocol engine 32 checks the hold flag (step 114). If the hold flag is set, the snoopy cache protocol engine 32 notifies the memory and cache protocol engine 40 that the request from the other node should be retried later (step 116) in conformance with the SCI protocol. Thus, any requests from other nodes for the data line are blocked or prevented so that the requesting processor can complete its transaction. If, on the other hand, the hold flag is not set, the other nodes can access the data line (step 118).

With the hold-for-forward-progress field 82 set, the snoopy cache protocol engine 32 can prevent access to all data requests from other nodes. For instance, any data request from another node is responded to with a retry request causing the other node to retry its request at a later time. Preferably, however, the snoopy cache protocol engine 32 checks the particular data line requested by another node and only rejects the request if it is for the same data line being held for a local processor. Thus, the method can prevent other nodes from accessing data on a per-line basis, not overly restricting inter-node access to data.

If the requesting processor retries its request (step 120), the installed data line is delivered to the requesting processor and the hold flag is cleared (step 122). Once the hold flag is cleared, other nodes are able to access the data line.

In step 124, the hold counter is decremented on every bus clock and checked to determine if the count is zero (step 120). If the count is zero, the hold flag is cleared and other nodes may access the data line. If, however, the count is not zero, the hold flag is unchanged and the other nodes are still prevented from accessing the data line. In other embodiments, the hold counter may be interrupt-driven, meaning every time an interrupt occurs, the hold counter is decremented. Alternatively, the hold counter may be decremented once every time a main loop in software is completed. The counter can be set to any desired value so that it counts for a given period of time (i.e., a predetermined period of time or variable period of time) before clearing the hold flag. Additionally, the counter may be incremented rather than decremented. Furthermore, the system clock may be checked at given periods of time to determine the amount of time the hold flag has been set. One skilled in the art recognizes that there are many different ways to measure time, including using a system clock or using a counter, and the invention is not limited to any particular means or duration of measuring time.

Having illustrated and described the principles of the invention in a preferred embodiment, it should be apparent to those skilled in the art that the preferred embodiment can be modified in arrangement and detail without departing from such principles.

For example, many of the software aspects of the embodiment may be implemented in hardware and vice versa, and the invention may be used with network interfaces other than SCI.

Additionally, although the remote cache interconnect 30 uses a hold-for-forward progress flag, a state machine can be used instead. Once data is received from the system interconnect, the state machine enters a state that prevents access to the data from other nodes. A retry request from the processor forces the state machine to enter another state that allows access to the data from other nodes.

Furthermore, a list of local processor requests could be used in place of the bus address registers. A data request from a remote node is checked against the list to ensure that the remote-node request is not data to be delivered to a local processor.

Still further, although the hold flag is described as preventing processors in other nodes from accessing data, it can also be used to prevent processors on the same node from accessing data. Alternatively, processors on the same node may access the data regardless of the hold flag.

In view of the many possible embodiments to which the principles of the invention may be applied, it should be recognized that the illustrated embodiment is only a preferred example of the invention and should not be taken as a limitation on the scope of the following claims. The steps described in a claim can be taken in any sequence unless their order is specified. We claim as the invention all that comes within the scope of these claims.

We claim:

1. In a multinode computer system having distributed shared memory, each node containing at least one processor, local memory for the processor and a remote cache for caching data obtained from memory on other nodes, a method of ensuring that a processor in a first node obtains control of requested data stored in a second node, the method comprising:

issuing a request for data from the processor on the first node;

requesting the data be delivered to the first node from the second node;

receiving the requested data in the first node;

once the requested data is received in the remote cache of the first node, preventing other nodes from accessing the requested data from the remote cache of the first node until after the processor on the first node retries the request for the requested data, wherein the first node controls the preventing of other nodes from accessing the requested data.

2. The method of claim 1 including:

measuring a time in which other nodes in the multinode system are prevented from obtaining the requested data; and if the measured time exceeds a given period, allowing the other nodes to access the requested data.

3. The method of claim 1 including preventing other nodes in the multinode system from accessing any data from the first node until after the processor has control of the requested data.

4. The method of claim 1 including allowing other nodes in the multinode system to access data on the first node except for the requested data, which the other nodes are prevented from accessing until after the processor has control of the requested data.

5. The method of claim 1 further including:

providing a hold flag;

setting the hold flag after the requested data is received by the first node; and in response to the hold flag being set, preventing other nodes on the computer system from accessing the requested data.

6. The method of claim 5 including:

providing the requesting processor with control of the requested data and clearing the hold flag so that other nodes can access the requested data.

7. The method of claim 5 including:

after a predetermined period of time, clearing the hold flag so that other nodes can access the requested data.

8. The method of claim 5 including informing the requesting processor to retry its request for the requested data at a later time.

9. The method of claim 8 including clearing the hold flag after the requesting processor retries its request for the requested data.

10. The method of claim 1 wherein the preventing step includes issuing a retry request to another node that attempts to access the requested data.

11. A computer system operating in accordance with the method of claim 1.

12. A multinode, shared memory computer system, comprising:
- a plurality of nodes, wherein a node includes a processor, a local memory and a remote cache and wherein one of the nodes is a home node that stores a memory block of interest;
- a shared memory distributed across the plurality of nodes, wherein the memory block of interest on the home node is stored in the shared memory;
- a system interconnect for allowing other nodes on the multinode computer system to access the memory block of interest on the home node; and
- storage for a hold flag on a remote node, when set the hold flag allowing the remote node to prevent other nodes on the multinode computer system from accessing the memory block of interest after the memory block of interest is received on the remote node.

13. The multinode computer system of claim 12 wherein a node further includes a snoopy cache protocol engine, local memory tags, and remote cache tags and wherein the snoopy cache protocol engine is for determining if requested data is located in memory or remote cache.

14. The multinode computer system of claim 13 including a storage location having a counter field, the counter field for limiting the amount of time the home node can prevent other nodes from accessing the requested data.

15. The multinode computer system of claim 13 including a bus address register located in the snoopy cache protocol engine, the bus address register including the storage for the hold flag.

16. In a multinode computer system, a method of ensuring a requesting processor within a node obtains data that is requested, the method comprising:
- providing a processor on a node that requests data;
- issuing a response to the requesting processor to retry its request later, the response generated by the node that includes the requesting processor;
- requesting other nodes on the computer to deliver data to a requesting node;
- receiving the data requested in the requesting node;
- after receipt of the data in the node that includes the requesting processor, preventing other nodes from accessing the data requested, wherein the preventing is controlled by the node that includes the requesting processor;
- if the requesting processor retries the request for the data, delivering the data to the requesting processor; and
- after the data is delivered to the requesting processor, allowing other nodes to access the data.

17. The method of claim 16 including measuring the time between receiving the data and delivering the data to the requesting processor.

18. The method of claim 17 including allowing other nodes to access the data if a given time limit is exceeded and the requesting processor did not retry the request for the data.

19. The method of claim 16 including searching the requesting node to determine if the requested data resides in local memory or cache.

20. In a multinode computer system, a method of ensuring that a processor in a first node obtains control of requested data stored in a second node, the method comprising the following steps:
- providing a shared memory distributed between at least the first and second nodes;
- requesting data to be delivered to a requesting processor on the first node;
- issuing a response to the requesting processor to retry its request later;
- requesting the requested data be delivered to the first node from the second node;
- receiving the requested data in the first node;
- once the requested data is received, issuing retry requests from the first node to other nodes that attempt to access the requested data on the first node;
- using the requesting processor on the first node, retrying the request for the requested data to be delivered to the requesting processor on the first node;
- delivering the requested data to the requesting processor; and
- after the requesting processor has control of the requested data, allowing other nodes to access the requested data.

21. The method of claim 1 including preventing processors on other nodes from accessing the requested data in the remote cache of the first node until the processor in the first node has control of the requested data.

22. The method of claim 1 including preventing processors on other nodes from accessing the requested data in the remote cache until a predetermined time after the requested data is received in the remote cache of the first node.

23. In a multinode, multiprocessor computer system with shared memory distributed across a plurality of nodes, a method of ensuring a requesting processor within a node obtains data that is requested, comprising:
- using a processor in a first node, requesting access to data;
- within the first node, issuing a response to the requesting processor for the requesting processor to retry its request for data at a later time;
- from the first node, requesting the data be delivered to the first node from one of the other nodes in the system;
- receiving the requested data in the first node;
- once the requested data is received, issuing retry requests to other nodes that attempt to access the requested data on the first node;
- using the requesting processor in the first node, retrying the request for access to the requested data;
- within the first node, delivering the requested data to the requesting processor; and
- after the processor has control of the requested data, allowing other nodes to access the requested data from the first node.

* * * * *

UNITED STATES PATENT AND TRADEMARK OFFICE
CERTIFICATE OF CORRECTION

PATENT NO. : 6,041,376
DATED : June 21, 2000
INVENTOR(S) : Bruce Micheal Gilbert, Robert T. Joersz, Thomas D. Lovett and Robert J. Safranek Page 1 of 1

It is certified that error appears in the above-identified patent and that said Letters Patent is hereby corrected as shown below:

Column 12,
Line 45, Claim 4, after "after the" insert --requesting--.

Column 14,
Line 57, Claim 23, after "after the" insert --requesting--.

Signed and Sealed this

Nineteenth Day of June, 2001

Attest:

*Attesting Officer*

NICHOLAS P. GODICI
*Acting Director of the United States Patent and Trademark Office*